US008990586B2

(12) United States Patent
Sharma et al.

(10) Patent No.: US 8,990,586 B2
(45) Date of Patent: Mar. 24, 2015

(54) METHOD FOR SELECTIVELY EXPOSING SUBSCRIBER DATA

(75) Inventors: Alok Sharma, Lisle, IL (US); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 153 days.

(21) Appl. No.: 13/282,009

(22) Filed: Oct. 26, 2011

(65) Prior Publication Data
US 2013/0109348 A1 May 2, 2013

(51) Int. Cl.
*G06F 12/14* (2006.01)
*H04W 12/08* (2009.01)
*H04L 29/06* (2006.01)

(52) U.S. Cl.
CPC .............. *H04W 12/08* (2013.01); *H04L 63/04* (2013.01); *H04L 63/105* (2013.01)
USPC .......................... 713/193; 379/93.03; 709/202

(58) Field of Classification Search
CPC ...................... H04M 15/47; H04M 2215/0148; H04W 12/12; H04W 12/06; H04W 12/08; H04W 4/02; H04W 4/028; H04W 8/16; H04W 8/18; H04L 63/107; G06F 17/2725; G06F 21/00; Y10S 707/99939
USPC ................... 713/193; 705/1, 14; 707/1, 10, 3; 379/93.03; 709/202
See application file for complete search history.

(56) References Cited

U.S. PATENT DOCUMENTS

| 5,805,674 A | * | 9/1998 | Anderson, Jr. ............. 379/93.03 |
| 8,255,288 B1 | * | 8/2012 | Gupta et al. ............... 705/26.41 |
| 2002/0111816 A1 | * | 8/2002 | Lortscher et al. ................. 705/1 |
| 2003/0093461 A1 | * | 5/2003 | Suzuki et al. ................. 709/202 |
| 2003/0115203 A1 | | 6/2003 | Brown et al. |
| 2003/0212649 A1 | * | 11/2003 | Denesuk et al. ................... 707/1 |
| 2004/0193694 A1 | | 9/2004 | Salo et al. |
| 2005/0076198 A1 | * | 4/2005 | Skomra et al. ................ 713/156 |
| 2008/0243784 A1 | * | 10/2008 | Stading ............................ 707/3 |
| 2011/0209214 A1 | * | 8/2011 | Simske et al. .................. 726/21 |
| 2011/0238483 A1 | * | 9/2011 | Yoo et al. .................... 705/14.38 |

OTHER PUBLICATIONS

PCT International Search Report corresponding to PCT Application No. PCT/US2012/060337 filed Oct. 16, 2012, International Search Report issued Jan. 24, 2013, pp. 1-4.
PCT Written Opinion of the International Searching Authority corresponding to PCT Application No. PCT/US2012/060337 filed Oct. 16, 2012, Written Opinion issued Jan. 24, 2013, pp. 5-9.

* cited by examiner

*Primary Examiner* — Brian Shaw
(74) *Attorney, Agent, or Firm* — Wolff & Samson PC

(57) ABSTRACT

Methods, systems, and apparatuses for selectively exposing subscriber data include maintaining subscriber data at a digital data storage, wherein the digital data storage is protected by a service provider firewall. A request to expose subscriber data from a third-party requestor is received. Selected subscriber data and a security condition associated with the request are determined, wherein the security condition is based on an identity of the third-party requestor. The selected subscriber data is retrieved if the security condition is satisfied, and the selected subscriber data is transmitted to the third-party requestor.

21 Claims, 13 Drawing Sheets

FIG. 5

APIs

SUBSCRIBER PROFILE MANAGEMENT:

| | |
|---|---|
| CREATE SUBSCRIBER | [POST] CREATE A NEW SUBSCRIBER PROFILE BASED UPON THE GIVEN INFORMATION AND RECEIVE THE SUBSCRIBER IDENTIFIER. |
| GET ALL SUBSCRIBERS | [GET] OBTAIN LIST OF ALL EXISTING SUBSCRIBERS SATISFYING AN OPTIONAL FILTER CRITERIA. RETURNS A LIST OF SUBSCRIBER IDENTIFIERS. |
| GET SUBSCRIBER | [GET] OBTAIN THE REQUESTED SUBSCRIBER PROFILE INFORMATION. |
| MODIFY SUBSCRIBER | [PUT] MODIFY AN EXISTING SUBSCRIBER'S DATA |
| DELETE SUBSCRIBER PROFILE | [DELETE] DELETE A PROFILE OF INFORMATION FOR A SUBSCRIBER |

SUBSCRIBER IDENTIFICATION:

| | |
|---|---|
| AUTHENTICATE VOICE | [POST] AUTHENTICATE PROVIDED VOICE SAMPLE WITH THE GIVEN SUBSCRIBER ID. |
| GET AUTHENTICATION PIN | [GET] GET ONE TIME ONLY USE PIN TO BE COMPARED WITH PIN PROVIDED BY CALLER. THIS WILL BE AVAILABLE AS AN ATTRIBUTE IN THE PARTY. |

APPLICATION MANAGEMENT:

| | |
|---|---|
| CREATE \| GET \| UPDATE \| DELETE APPLICATION ACCESS | CREATE, RETRIEVE INFORMATION ABOUT INDIVIDUAL APPLICATION THAT HAS ACCESS TO SUBSCRIBER PROFILE FIELDS; RETRIEVE LIST OF FIELDS AN APPLICATION HAS ACCESS TO. |
| GET ALL APPLICATIONS | RETRIEVES ALL APPLICATIONS THAT HAVE ACCESS TO USER PROFILE ATTRIBUTES |

DEVICE PROPERTIES
(THESE ARE AVAILABLE AS LIST OF ATTRIBUTES ON DEVICE OR VIA INDIVIDUAL ATTRIBUTE REQUEST):

| | |
|---|---|
| GET DEVICE MANUFACTURER | RETURNS THE DEVICE MANUFACTURER |
| GET DEVICE MODEL | RETURNS THE DEVICE MODEL |
| GET UserAgentProfileReference | RETURNS THE URL WHERE THE USER AGENT PROFILE XML FILE IS LOCATED |

CURRENT CALL PARTY ATTRIBUTES:

| | |
|---|---|
| SECURE CALLER ID | VERIFY THE EXISTENCE OF A CONNECTION BETWEEN TWO NUMBERS. CHECK CALLER'S CALLER ID CREDENTIALS BY ACCESSING THE INFORMATION IN THE IMS HSS (8650 SDM). REQUIRES THE CALLER TO BE AN IMS SUBSCRIBER? |
| GET CONFIDENCE SCORE | GET THE AUTHENTICATION CONFIDENCE SCORE OF THE SUBSCRIBER |
| GET LIVELINESS PHRASE | GET THE RANDOM ONE-TIME PHRASE USED FOR LIVELINESS VERIFICATION FOR THIS CALL |
| GET LOCATION | CURRENT LOCATION OF THE DEVICE |

PROFILE ATTRIBUTES:

| | |
|---|---|
| GET PROFILE | GET CURRENT DEVICE USER PROFILE ATTRIBUTES |

METHOD FOR SELECTIVELY EXPOSING SUBSCRIBER DATA

TECHNICAL FIELD

The present disclosure relates to selectively exposing subscriber data maintained by a telecommunications service provider to third parties.

BACKGROUND

Telecommunications service providers are currently looking for solutions that enable the monetization of their network assets beyond traditional models such as long-distance and toll-free calling services. For example, service providers can turn the vast amounts of data they have about their subscribers into valuable "contextual" information for third-parties. However, this subscriber contextual data is often not readily accessible to third-parties, and is not typically exposed in a manner that is both efficient and secure.

SUMMARY

Methods, systems and articles of manufacture for selectively exposing subscriber data may be implemented by maintaining subscriber data at a digital data storage, wherein the digital data storage is protected by a service provider firewall. A request to expose subscriber data from a third-party requestor is received via an application programming interface. Selected subscriber data and a security condition associated with the request are determined. The security condition is based on an identity of the third-party requestor. The selected subscriber data is retrieved if the security condition is satisfied, and the selected subscriber data is transmitted to the third-party requestor.

In accordance with an embodiment, selectively exposing subscriber data may be implemented by determining whether a subscriber opt-in rule is associated with the selected subscriber data. The selected subscriber data is retrieved if the subscriber opt-in rule is satisfied. The subscriber opt-in rule may be satisfied based on a subscriber opt-in response, such as a voice or text message response. A time-limit may be imposed for receiving the subscriber opt-in response.

In accordance with an embodiment, selectively exposing subscriber data may be implemented by updating the subscriber opt-in rule based on the subscriber opt-in response. A new subscriber opt-in rule may be generated based on the subscriber opt-in response.

In accordance with an embodiment, selectively exposing subscriber data may be implemented by maintaining the subscriber data in a cache memory. The selected subscriber data may include at least one of subscriber profile, device property or location data.

These and other advantages will be apparent to those of ordinary skill in the art by reference to the following detailed description and the accompanying drawings.

BRIEF DESCRIPTION OF THE DRAWINGS

FIG. 5 is a chart illustrating API functions according to an embodiment;

DETAILED DESCRIPTION

Subscriber data maintained by telecommunications service providers, including customer profile, device identity and customer authentication data may be selectively exposed to third-parties for improving customer-service applications (e.g., network-based call handling, and mobile payments), enabling customer-service applications and other uses. It should be appreciated that such applications may be web-based applications (e.g., browsers and social networks).

Figure 1:
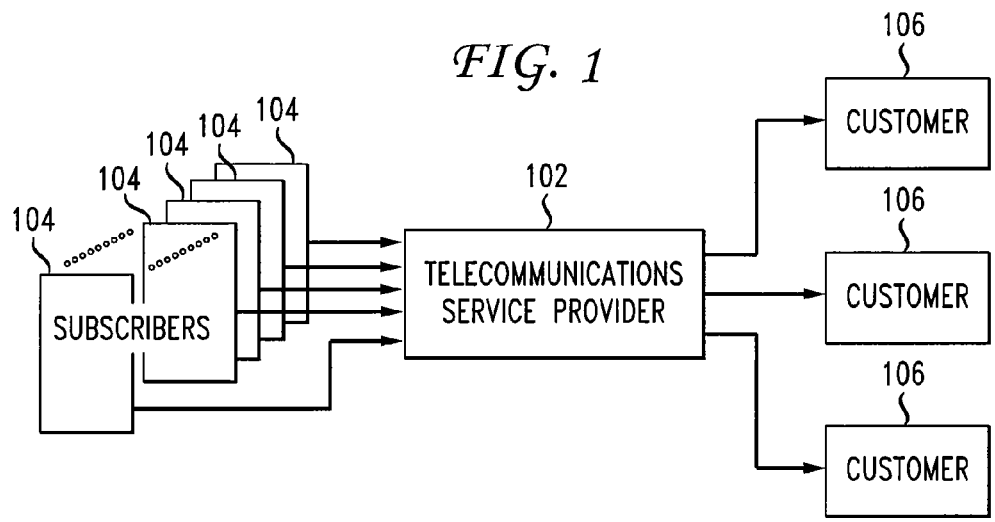
FIG. 1 illustrates a system for selectively exposing subscriber data maintained by a telecommunications service provider according to an embodiment.

FIG. 1 illustrates an environment for selectively exposing subscriber data maintained by a telecommunications service provider according to an embodiment. Typically, a telecommunications service provider 102 (also referred to herein as a "service provider") receives and maintains subscriber data 104, such as user profile, device capability or location data. In turn, a service provider 102 may wish to selectively expose the subscriber data it maintains to its customers 106 (e.g., third-party enterprises, Web-based applications). For example, the subscriber data may help customers 106 to improve their own customer service, such as by making call center operations more secure and efficient (e.g., through shorter customer interaction times, customized video streams and text messaging, improved call routing and enhanced privacy).

Figure 2:
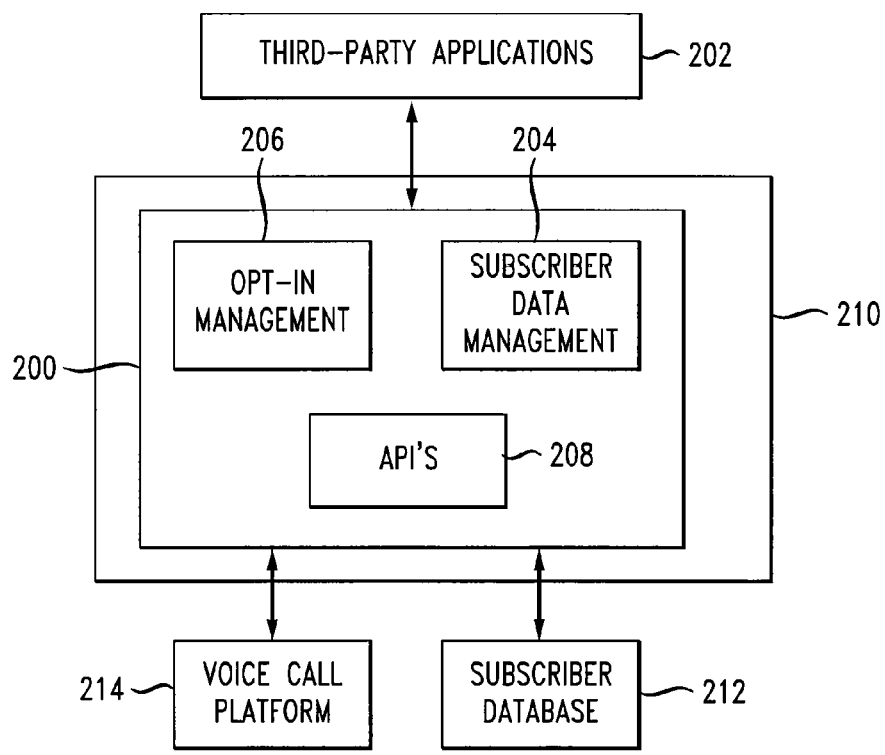
FIG. 2 is a component diagram illustrating a subscriber data exposure platform according to an embodiment.

FIG. 2 is a component diagram illustrating a subscriber data exposure platform according to an embodiment. The subscriber data exposure platform 200 manages the exposure of subscriber data to third-party (e.g., customer) applications 202. In one embodiment, the platform 200 includes a subscriber data management element 204 and an opt-in management element 206. In addition, the platform 200 includes one or more APIs 208 for interfacing with third-party applications 202.

The subscriber data management element 204 may store and retrieve subscriber data from one or more subscriber databases, such as a subscriber database 212 protected by a service provider firewall at a telecommunications service provider 102. The subscriber data management element 204 may also update the subscriber data in a subscriber database 212 based on periodic or push-based notifications from a service provider 102.

The subscriber data management element 204 selectively exposes subscriber data to customers 106 in response to requests received via the APIs 208. As described in further detail below, the subscriber data management element 204 may employ a variety of security algorithms to selectively expose subscriber data. For example, the subscriber data management element 204 may require a subscriber 104 to affirmatively opt-in for the exposure of sensitive subscriber data, while subscriber opt-in may not be required for the exposure of other less sensitive data. As such, the opt-in management element 206 may manage subscriber opt-in information, and may also initiate message-based or offline Web-based subscriber opt-in capabilities by contacting a subscriber 104 for opt-in permission and allowing the subscriber data to be exposed only if a subscriber opt-in rule is satisfied.

The selective exposure of subscriber data may also include subscriber authentication. For example, a confidence level score (e.g., 0 to 100%) may represent a confidence level that a subscriber (or other requesting entity) is who they claim to be. In one embodiment, the subscriber data management element 204 may determine a confidence level score for authenticating a subscriber 104 by accessing a voice call platform 214 that monitors biometric characteristics of the subscriber's voice (e.g., via a voice recognition algorithm), in combination with other factors, such as a device's current location. For example, if the device location is known to be the subscriber's home or work address, the confidence level score may increase. On the other hand, if the device shows recent unusual calling or location patterns this could lower the score, or prompt the subscriber data management element 204 to make one or more additional authentication requests, such as for a personal identification number (PIN), password or the like. While the preceding example is exemplary, it will be appreciated that a variety of techniques (e.g., neural networks, advanced metrics and the like) may be used to determine a confidence level score, or otherwise determine that a subscriber or other requesting entity is who they claim to be, for authentication purposes.

For ease of understanding, the platform 200 is described as comprising discrete elements performing discrete tasks. However, one skilled in the art will appreciate that the functions of one or more of the elements may be combined and/or performed by one or more consolidated elements, such as a processor in cooperation with memory. Further, a service provider 102 may wish to bundle the selective exposure of subscriber data with other services (e.g., legacy services such as toll-free and long distance applications). Therefore, it should be understood that one or more elements or functions of the platform 200 may be integrated into various elements or functions of a general application exposure platform 210.

Figure 3:
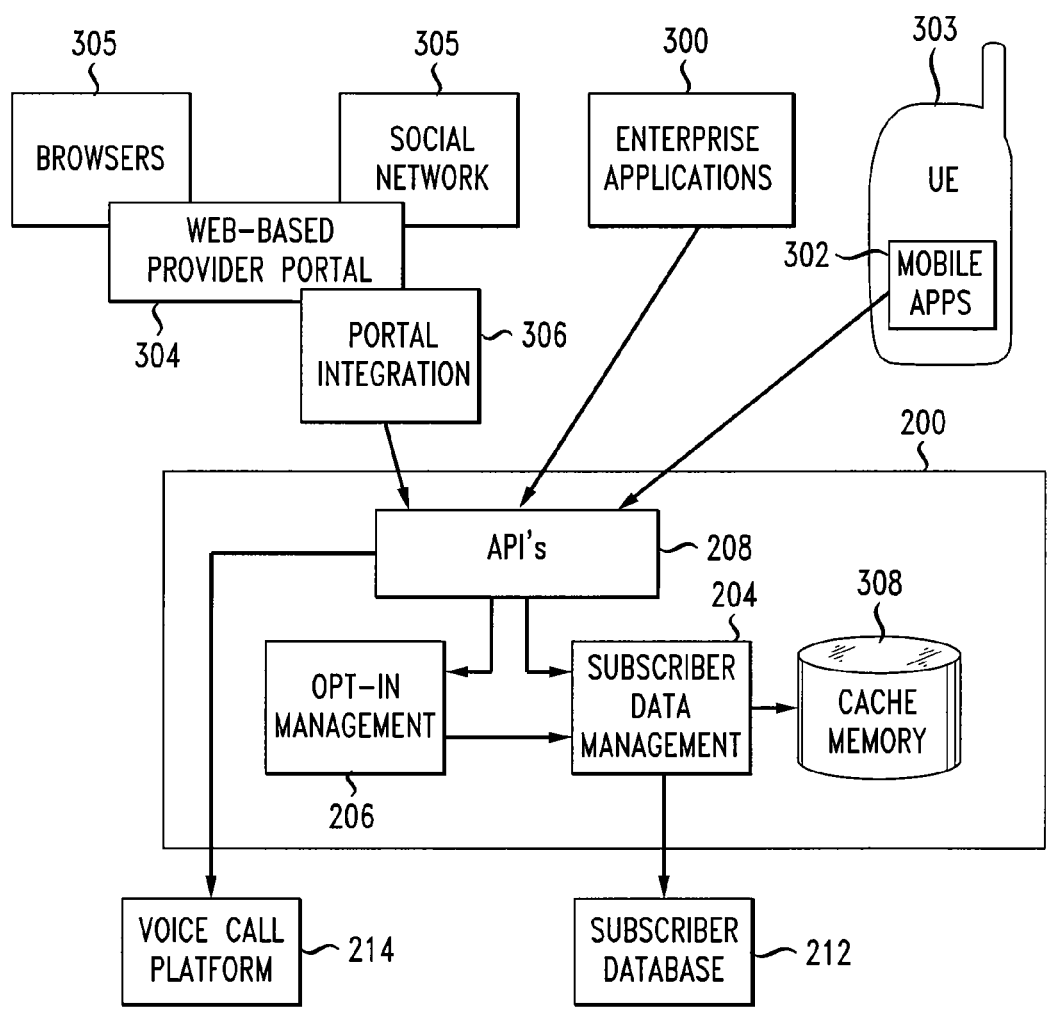
FIG. 3 is a component diagram illustrating a subscriber data exposure platform according to an embodiment.

FIG. 3 is a component diagram illustrating a subscriber data exposure platform according to an embodiment, wherein APIs 208 are exposed to a variety of third-party applications, such as enterprise applications 300 (e.g., call center platforms), mobile applications 302, and Web-based browsers and social networks 305.

In one embodiment, a mobile application 302 intercepts a call dialed from a mobile device 303 (e.g., a user equipment device such as a smart-phone) when subscriber opt-in is required before the call is connected. For example, a call directed to a customer 106 may be received at an API 208, and the subscriber data management element 204 may direct the mobile application 302 to present a graphical user interface (GUI) prompt asking whether the dialing subscriber wishes to opt-in to share data with the customer 106.

In another embodiment, certain trusted Web-based providers, such as browsers and social networks 305, may have a provider Web-based portal 304 for providing off-line customer services, such as authenticating subscribers. The platform 200 may include a portal integration module 306 for interfacing with a provider Web-based portal 304 to access subscriber authentication, new subscriber enrollment, off-line subscriber opt-in management and other capabilities in lieu of performing such operations internally. For example, a provider Web-based portal 304 may be allowed to opt-in for data exposure on behalf of a subscriber.

The platform 200 may also include a cache memory 308, such as for frequently exposed subscriber data that would typically be stored in the subscriber database 212. The cache memory 308 may be accessible for storing, pre-retrieving or reconstructing subscriber data 212 from one or more service providers 102 to avoid performance penalties during real-time data lookups. For example, new subscriber data and third-party application attributes may initially be stored in the cache memory 308 for increased speed and efficiency.

In another embodiment, when selected subscriber data from a particular service provider 102 is proprietary, or only a subset of subscriber data is available, the cache memory 308 may be accessible for reconstructing the unavailable, restricted or missing subscriber data from available data (e.g., a home time-zone update may be reconstructed based on a subscriber's known address).

Figure 4:
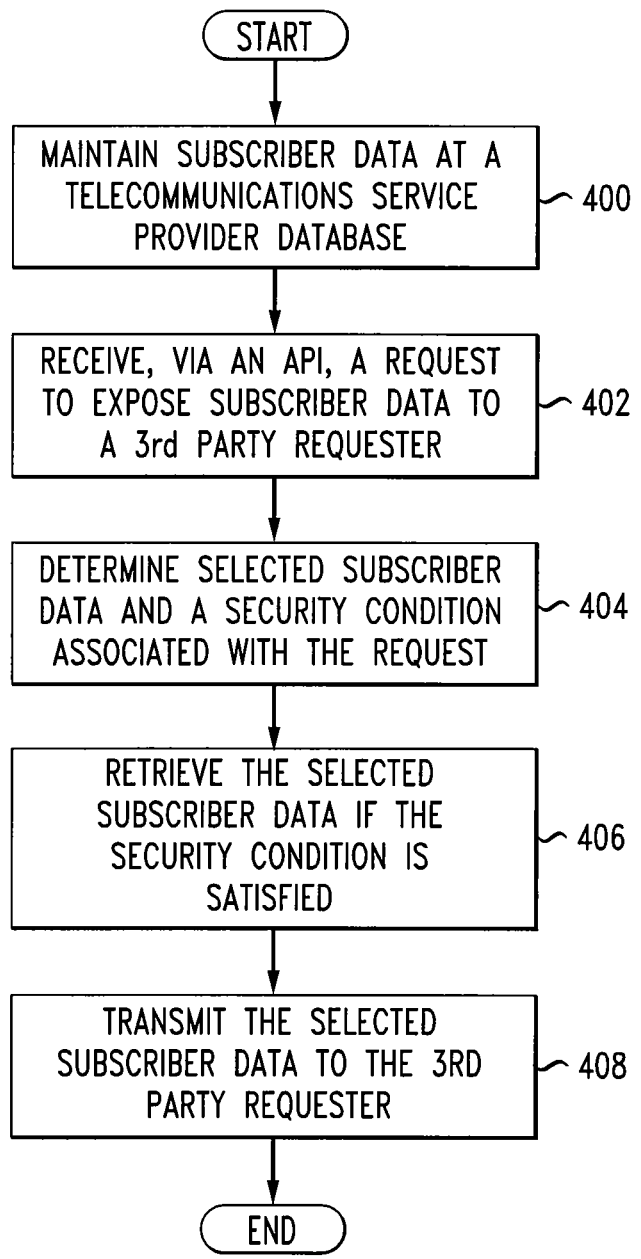
FIG. 4 is a flowchart illustrating the operation of the subscriber data exposure platform according to an embodiment.

FIG. 4 is a flowchart illustrating the operation of the subscriber data exposure platform according to an embodiment. At 400, the subscriber data management element 204 maintains subscriber data at a telecommunications service provider subscriber database protected by a service provider firewall, such as the subscriber database 212. At 402, the subscriber data management element 204 receives, via an application programming interface 208, a request to expose subscriber data to a third-party requestor (e.g., an enterprise application 300, mobile application 302, or Web-based provider 305). At 404, the subscriber data management element 204 determines selected subscriber data and a security condition associated with the request, wherein the security condition is based on an identity of the third-party requestor. Then, at 406, the subscriber data management element 204 retrieves the selected subscriber data (from the telecommunications service provider subscriber database 212 or cache memory 308) if the security condition is satisfied, and transmits the selected subscriber data to the third-party requestor at 408. For example, the subscriber data management element 204 may authenticate the third-party requestor to satisfy the security condition.

As mentioned above, the platform 200 includes one or more APIs 208 interfacing with third-party applications 202, and in the various embodiments, the APIs 208 may include any function that relates to subscriber data maintained by one or more service providers 102. FIG. 5 is a chart illustrating API functions according to an embodiment. For example, APIs 208 may include functions related to subscriber profile management (get/get all/create/modify/delete subscriber data), subscriber identification (authenticate voice or get authentication PIN), application management (create/get/update/delete application access, get all applications), device properties (get manufacturer/model/location), current call party attributes (secure caller ID, get confidence score/liveliness phrase/location, profile attributes (get current device user profile) or other features. One skilled in the art will note that the API functions of FIG. 5, while exemplary, are not exhaustive and that other API functions are possible.

FIGS. 6-12 are call-flow charts illustrating various API requests, including API requests that may require subscriber opt-in according to the various embodiments.

Figure 6:
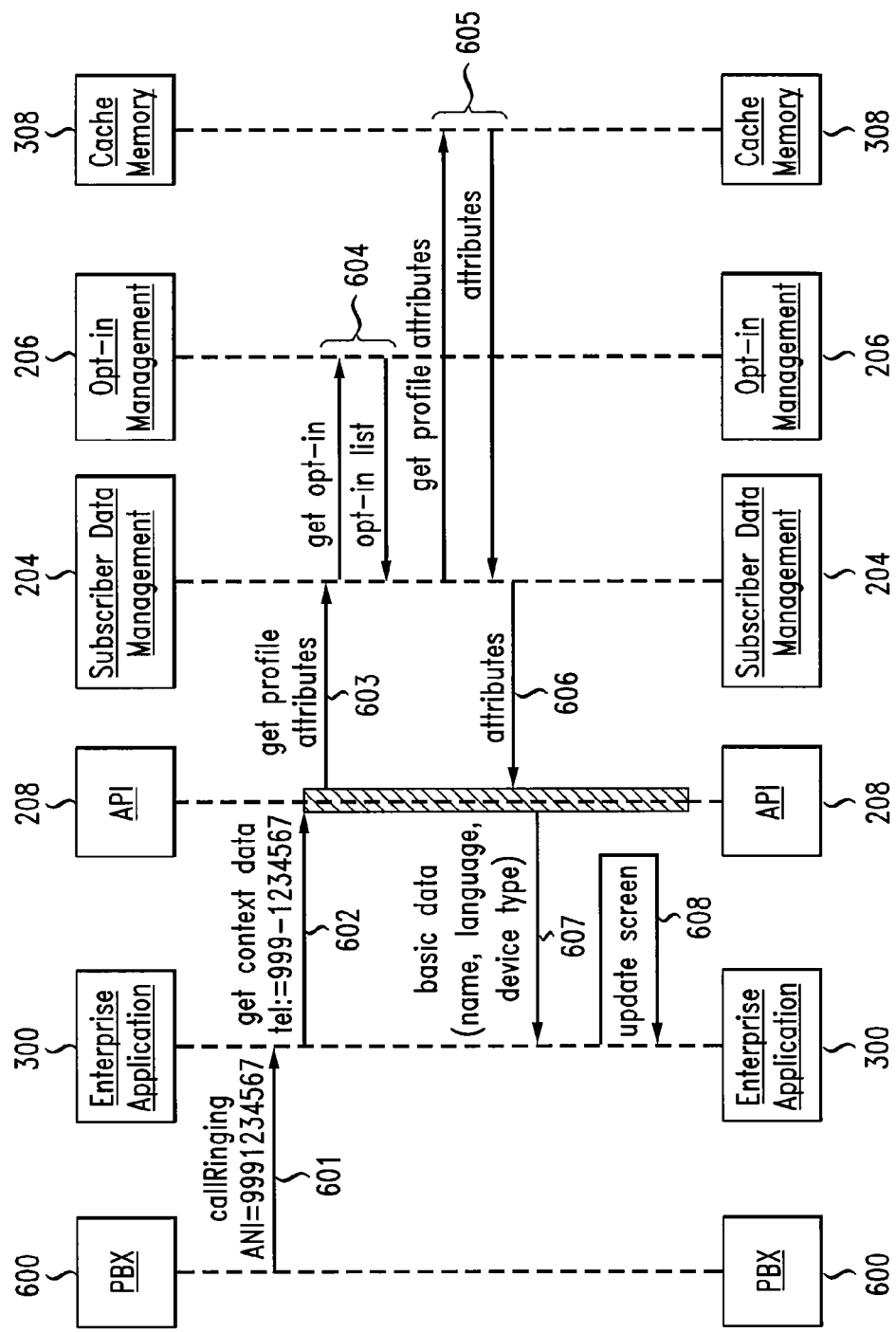
FIG. 6 is a call-flow chart for accessing subscriber profile attributes according to an embodiment.

FIG. 6 is a call-flow chart for accessing subscriber profile attributes according to an embodiment. At 601, a subscriber calls an enterprise application 300 (e.g., an application running at a commercial bank) via a public exchange (PBX) network 600. The subscriber's call may be delivered to an agent, who may send a request for data associated with the calling subscriber to an API 208 at 602. At 603, the API 208 sends a "get profile attributes" request to the subscriber data management element 204, which accesses the opt-in management element 206 to determine whether subscriber opt-in is required at 604. If no opt-in is required, the subscriber data management element 204 determines and then retrieves the profile attributes from the cache memory 308 at 605, and transmits the profile attributes back to the API 208 at 606. The profile attributes are then forwarded via the API 208 to the enterprise application 300 at 607 for a screen update including the profile attributes at 608.

Figure 7:
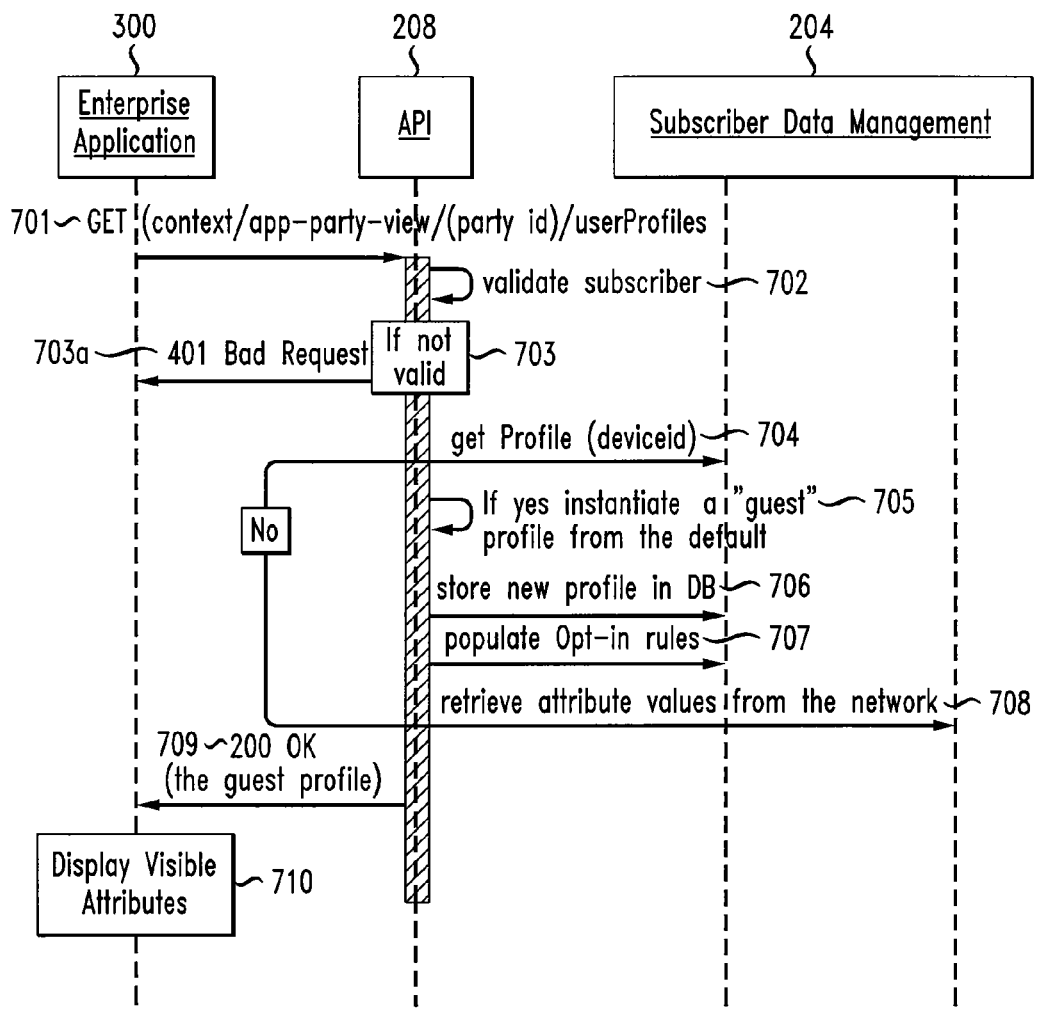
FIG. 7 is a call-flow chart for a voice call with no subscriber opt-in according to an embodiment.

FIG. 7 is a call-flow chart for a voice call with no subscriber opt-in according to an embodiment. At 701, an enterprise application 300 sends a request to an API 208 for subscriber data to create a user profile. For example, the request may contain identification information for the API 208 to validate the subscriber at 702. If no subscriber with the specified identification is found (at 703), the API 208 may send a bad request indication to the enterprise application at 703a. If the identification is valid, the API sends a "get profile" call to the subscriber data management element 204 at 704. The subscriber data management element 204 may then determine if a user profile exists. For example, if there is no user profile associated with the request, the API 208 creates a new guest user profile from a default user profile at 705 and sends a request to the subscriber data management element 204 to store the new profile in a database (e.g., cache memory 308) at 706. At 707, the API calls the subscriber data management element 204 to populate the opt-in rules for the user profile. The API 208 may then call the subscriber data management element 204 to determine and retrieve attribute values for the guest profile at 708 (repeating the logic at 707 and 708 for each attribute in the user profile). At 709, the API 208 sends the guest profile to the enterprise application 300, and the enterprise application 300 displays the attributes (e.g., for a customer service call with the subscriber) at 710.

Figure 8:
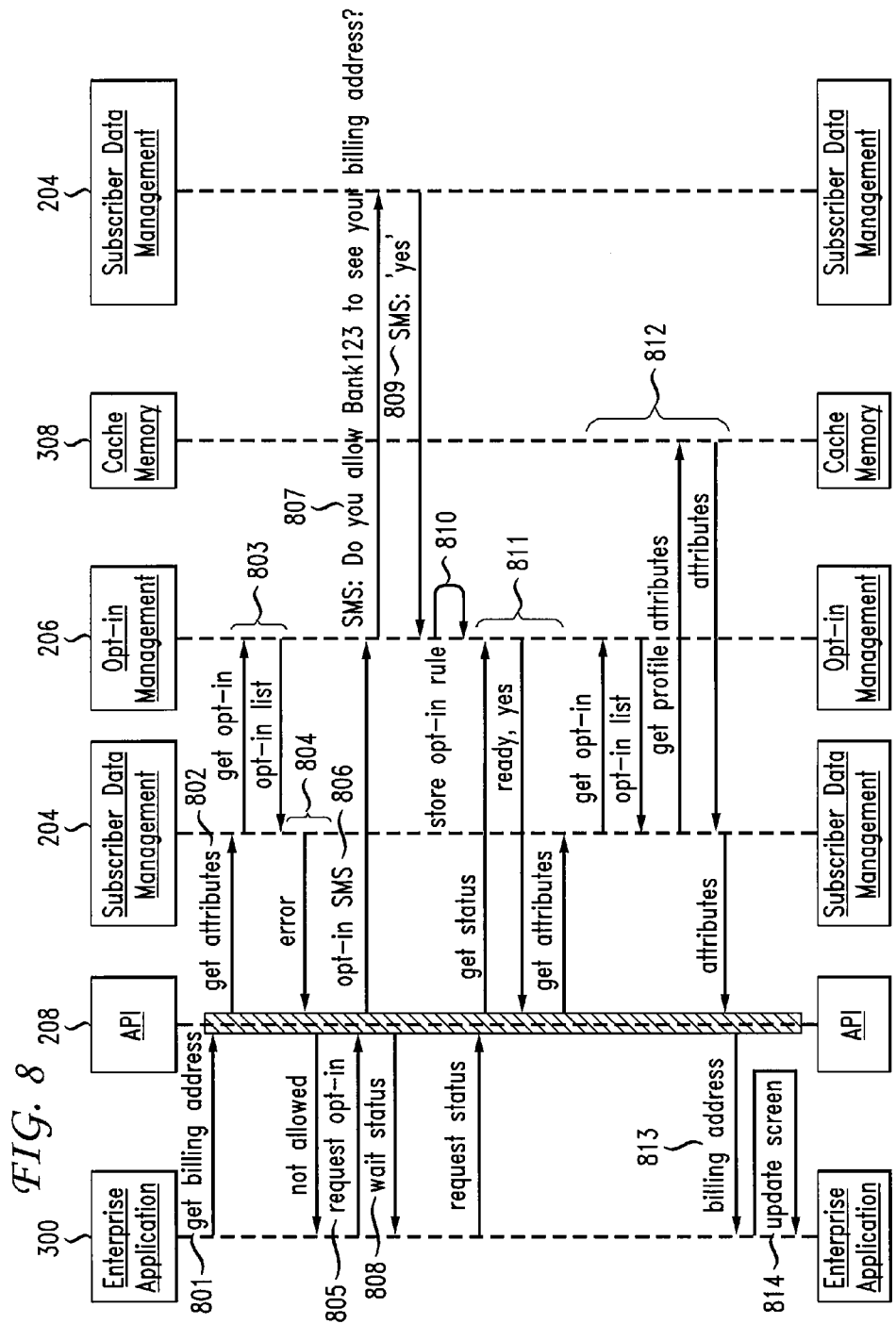
FIG. 8 is a call-flow chart for an SMS message subscriber opt-in according to an embodiment.

FIG. 8 is a call-flow chart for an SMS message subscriber opt-in according to an embodiment. In one embodiment, a subscriber may call an enterprise, such as a bank, and the subscriber's call may be routed to a customer service agent running an enterprise application 300. For example, the enterprise application 300 may display a document associated with the subscriber (e.g., a loan application) to assist in processing the call. The document may then be populated based on subscriber data (billing address, language preference, etc.) retrieved from a service provider. For example, when the enterprise application 300 sends a request for a billing address to an API 208 at 801, the API 201 receives the request and calls the subscriber data management element 204 to get the billing address attribute at 802. When the subscriber data management element 204 determines the selected subscriber data for fulfilling the request, it accesses the opt-in management element 206 to determine if subscriber opt-in is required for any of the attributes at 803. For example, the opt-in management element 206 may respond by returning an opt-in list showing that one or more of the requested attributes require subscriber opt-in. In the event of a required subscriber opt-in, the subscriber data management element 204 may initially return an error message to the API 201 at 804, informing the API 208 (and the enterprise application 300) that the requested data is not allowed to be displayed. The enterprise application 300 may then send a request to obtain opt-in permission (805), and the API 208 may access the opt-in management element 206 to send an opt-in SMS message to the subscriber at 806. For example, the subscriber may be presented with an SMS or WAP opt-in message request to allow or deny the sharing of a list of data with the requesting enterprise. In one embodiment, as the SMS is sent and the response wait status is communicated by the API 208 to the enterprise application 300 at 808, a customer service agent in communication with the subscriber may assist the subscriber with the opt-in process. If the subscriber responds by opting-in (809), the opt-in management element 206 stores the subscriber's opt-in response at 810 and communicates the opt-in status to the API 208 at 811. Then, the subscriber data management element 204 may be called to retrieve the subscriber data associated with the request at 812, and transmit the data (via the API 208) to the enterprise application 300 at 813. The customer service agent may then refresh a display to receive the updated subscriber data at 814.

Figure 9:
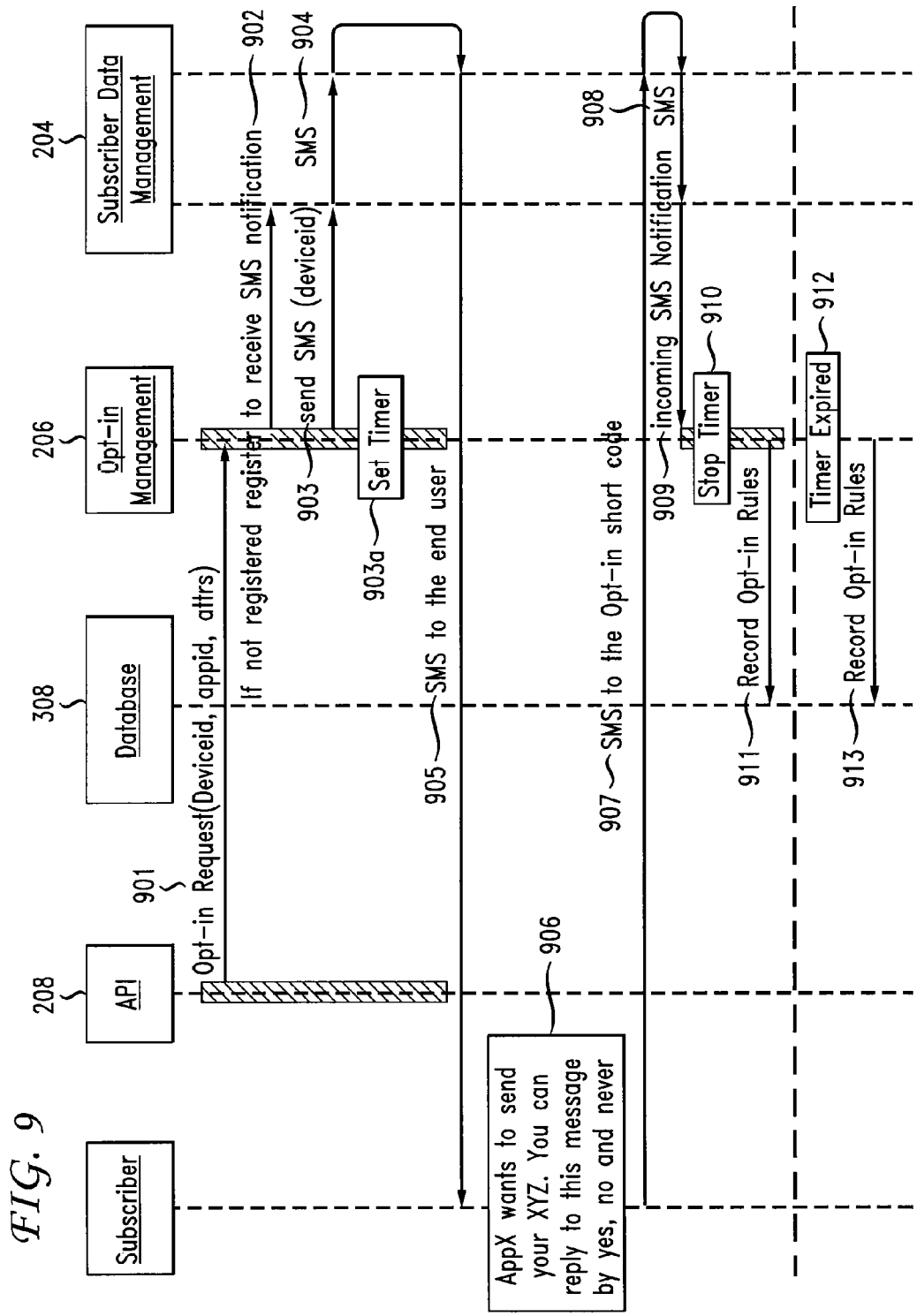
FIG. 9 is a call-flow chart for an SMS message subscriber opt-in according to another embodiment.

FIG. 9 is a call-flow chart for an SMS message subscriber opt-in according to another embodiment. At 901, the API 208 sends an opt-in request (e.g., device ID, application ID, attributes, etc.) to the opt-in management element 206. At 902, opt-in management element 206 may register to receive incoming SMS notifications (e.g., SMS messages corresponding to its short code) related to the request. The opt-in management element 206 may then create an SMS text request (e.g., "{applicationId} wants to see your {attribute} . . . {attribute}") to be sent via a subscriber data management element 204 to the subscriber at 903-905, and the subscriber may respond, for example, by indicating "yes", "no" or "never" at 906. When the subscriber responds at 907, the opt-in management element 206 receives notification from the subscriber data management element 204 (at 908) of the SMS message received at 909. In one embodiment, the opt-in management element 206 may start a timer with a predetermined expiration when the SMS is sent at 903a. The timer will either stop at 910 when a response is received from the subscriber, or will time out at 912 if a response is not received. In either case, the opt-in management element 206 creates and records (e.g., in cache memory 308) an opt-in rule based on the SMS reply at 911 (if a response is received) or at 913 if the timer expires without a response. In one example, if the reply is 'yes', an opt-in rule value set to "read" may expire, and an 'at' rule value may be set to the (current time)+a determined expiration interval. If the reply is 'no', a rule value set to "invisible" may expire, and the 'at' rule value may be set to the (current time)+determined expiration interval. If the reply is "never", the rule value may be set to "invisible", and the 'at' value may be set to "never".

Figure 10:
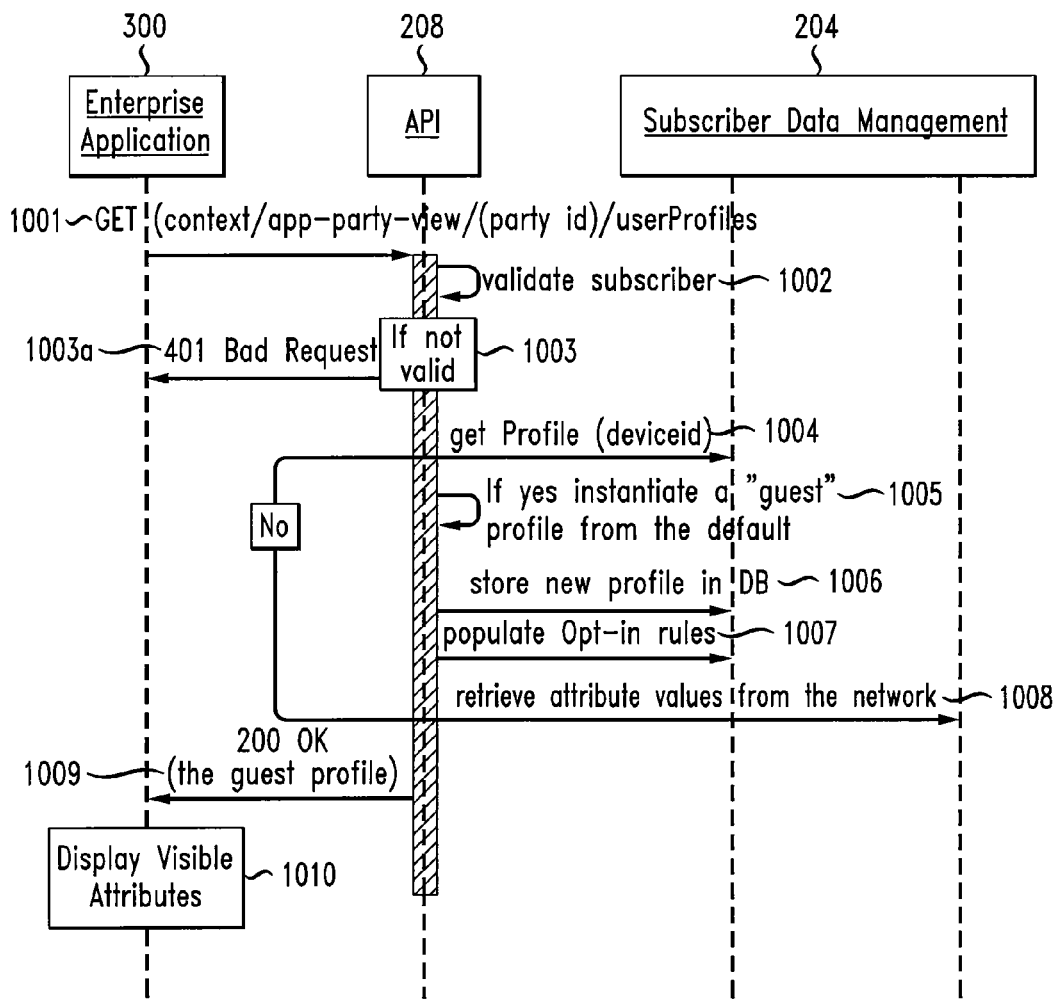
FIG. 10 is a call-flow chart for a voice call with subscriber opt-in according top an embodiment.

FIG. 10 is a call-flow chart for a voice call with subscriber opt-in according to an embodiment. In one embodiment, the subscriber data management element 204 retrieves subscriber data in response to a request that are not visible by default and require subscriber opt-in. At 1001, an enterprise application 300 sends a request for subscriber data (e.g., GET context/app-party-view/{party Id}/attributes) to an API 208, and the API 208 validates the subscriber at 1002. For example, if the subscriber is determined to be invalid at 1003, the API 208 may send a "401 bad request" response at 1003a. If the subscriber is valid, the API 208 calls the subscriber data management element 204 to determine if subscriber opt-in rules are associated with the request at 1004 (i.e., the subscriber data management element 204 retrieves the subscriber profile). If subscriber opt-in is required, the subscriber data management element 204 may access the opt-in management element 206 to execute an online opt-In process. For example, the API 208 may create a default profile at 1005 and call the subscriber data management element 204 to store the profile (without attribute values) at 1006. The API 208 may then call the subscriber data management element 204 to populate the opt-in rules at 1007 and/or retrieve attribute values from a service provider at 1008. In one embodiment, the opt-in management element 206 performs the opt-in process asynchronously. If the subscriber opts-in before the subscriber data management element 204 collects the opt-in attributes, the subscriber data management element 204 populates the response with a list of allowed attributes and their values and sends the response back to the enterprise application 300 (via the API 208) at 1009. The enterprise application 300 may then display the allowed attributes at 1010.

Figure 11:
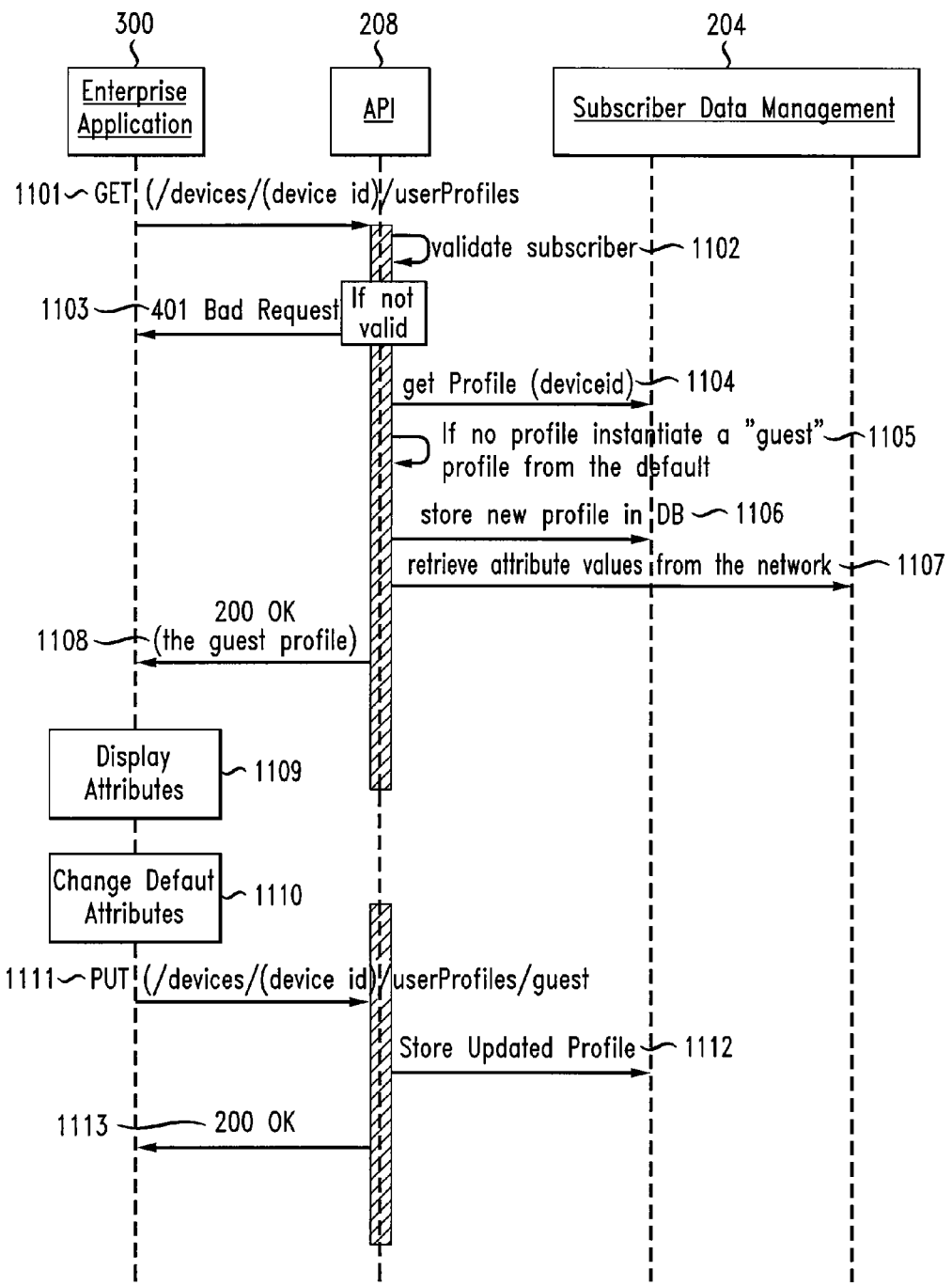
FIG. 11 is a call-flow chart for a portal opt-in according to an embodiment.

FIG. 11 is a call-flow chart for a portal opt-in according to an embodiment. In one embodiment, at 1101 an API 208 receives a request from an enterprise application 300 for a user profile (e.g., GET . . . /context/devices/{deviceId}/user-Profiles . . . ). At 1102, the API 208 validates the subscriber. If no subscriber records match, a "401 bad Request" message is returned at 1103. At 1104, the API 208 calls the subscriber data management element 204 to determine if a subscriber profile and/or device identification exists for the subscriber. If there is no profile associated with the subscriber stored in the system, the API 208 may create a new guest profile from, for example, a default user profile at 1105 and call the subscriber data management element 204 to store the new profile at 1106. At 1107, the API 208 may call the subscriber data management element 204 to collect visible profile attributes from a service provider. In one embodiment, the subscriber data management element 204 may populate a response payload (e.g., an XML document) with a new user profile including the visible attributes and send the profile (1108) in an HTTP response to the enterprise application 300 (via the API 208) for a service provider portal to display the profile at 1109. At 1110, the subscriber may then change various default parameters and send the changes to the API 208 at 1111. The API 208 may then call the subscriber data management element 204 to store the updated profile at 1112 and the existing rules will be evaluated based on the new attribute values at 1113.

Figure 12:
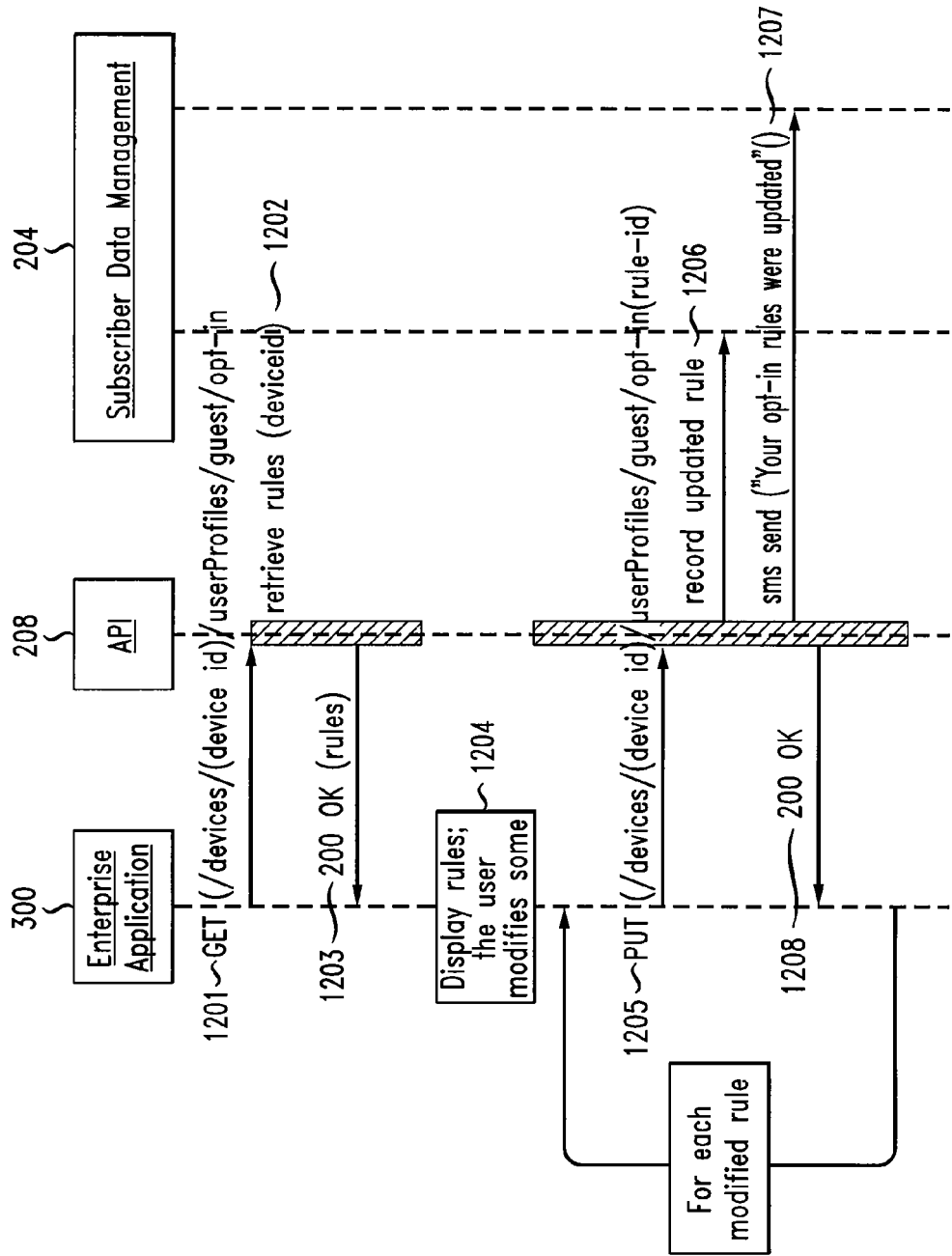
FIG. 12 is a call-flow chart illustrating a service provider request update opt-in according to an embodiment.

FIG. 12 is a call-flow chart illustrating a service provider request update opt-in according to an embodiment. In one embodiment, an enterprise application 300 sends a request to retrieve subscriber opt-in rules to an API 208 at 1201. The API 208 call the subscriber data management element 204 to retrieve the opt-in rules at 1202 and responds to the request at 1203. The enterprise application 300 may then display the rules at 1204, which a subscriber may update as desired. If the rules are updated, an update request may be sent to an API 208 at 1205 which contains at least one updated opt-in rule. At 1206, the API 208 calls the subscriber data management element 204 to update the opt-in rule, and send an SMS notification of the update to the subscriber at 1207. The API 208 then informs the enterprise application 300 of the update at 1208. The steps 1205-1208 may be repeated for each updated rule.

Figure 13:
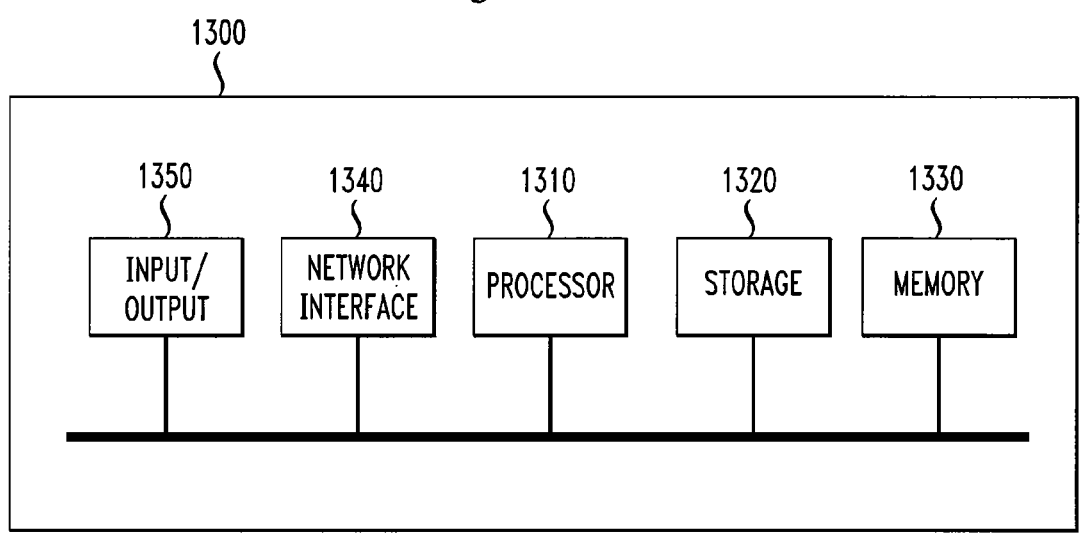
FIG. 13 is a high-level block diagram of an exemplary computer that may be used for implementing a subscriber data exposure platform.

The above-described methods may be implemented on a computer using well-known computer processors, memory units, storage devices, computer software, and other components. A high-level block diagram of such a computer is illustrated in FIG. 13. Computer 1300 contains a processor 1310, which controls the overall operation of the computer 1300 by executing computer program instructions which define such operation. The computer program instructions may be stored in a storage device 1320 (e.g., magnetic disk) and loaded into memory 1330 when execution of the computer program instructions is desired. When processor-executable computer program instructions are implemented by the processor 1310, one or more program code segments of the computer program instructions may combine with the processor 1310 to provide a unique device that operates analogously to specific logic circuits. Thus, the steps of the method of FIGS. 4 and 6-12 may be defined by the computer program instructions stored in the memory 1330 and/or storage 1320 and controlled by the processor 1310 executing the computer program instructions. The computer 1300 may include one or more network interfaces 1340 for communicating with other devices via a network for implementing the steps of the method of FIGS. 4 and 6-12. The computer 1300 may also include other input/output devices 1350 that enable user interaction with the computer 1300 (e.g., display, keyboard, mouse, speakers, buttons, etc.). One skilled in the art will recognize that an implementation of an actual computer could contain other components as well, and that FIG. 13 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

We claim:

1. A method comprising:
    at a processor communicatively coupled to a digital data storage, maintaining subscriber data at the digital data storage, wherein the digital data storage is protected by a service provider firewall;
    receiving, via an application programming interface communicatively coupled to the processor, a request from a third-party requestor to expose the subscriber data;
    determining, by the processor in cooperation with the digital data storage, selected subscriber data and a security condition associated with the request;
    determining a historical calling pattern and a historical location pattern of the third-party requestor, the historical calling pattern and the historical location pattern determined for a selected time period and relative to a stored location pattern associated with the third-party requestor;
    requesting authentication information of the third-party requestor based on a result of the historical calling pattern and the historical location pattern of the third-party requestor determined relative to the stored location pattern associated with the third-party requestor;
    determining a confidence level score representing a confidence level in a represented identity of the third-party requestor, wherein the confidence level score varies relative to a threshold confidence level score of the security condition based on one of a monitored characteristic of the third-party requestor and a determined location of the third-party requestor, and wherein the monitored characteristic includes the determined historical calling pattern, the previous historical location pattern, and the authentication information of the third party requestor;
    responsive to a reduction in the confidence level score based upon the historical calling pattern and the historical location pattern, requesting additional authentication data from the third-party requestor in order to satisfy the threshold confidence level score;
selectively retrieving, by the processor in cooperation with the digital data storage, the selected subscriber data if the threshold confidence level score of the security condition is satisfied; and
transmitting, by the processor in cooperation with the digital data storage, the selected subscriber data to the third-party requestor.

2. The method of claim 1, wherein retrieving further comprises determining whether a subscriber opt-in rule is associated with the selected subscriber data; and
retrieving the selected subscriber data if the subscriber opt-in rule is satisfied.

3. The method of claim 2, wherein the subscriber opt-in rule is satisfied based on a subscriber opt-in response.

4. The method of claim 3, further comprising determining a time-limit for receiving the subscriber opt-in response.

5. The method of claim 1, further comprising maintaining the subscriber data in a cache memory.

6. The method of claim 1, wherein the selected subscriber data includes at least one of subscriber profile, device property or location data.

7. The method of claim 1, wherein the security condition comprises an authentication confidence indication.

8. The method of claim 1, further comprising receiving the request from one of a Web-based provider portal, enterprise application or mobile application.

9. An apparatus comprising:
an application programming interface configured to receive a request from a third-party requestor to expose subscriber data; and
a subscriber data management element configured to:
maintain the subscriber data at a digital data storage, wherein the digital data storage is protected by a service provider firewall;
determine selected subscriber data and a security condition associated with the request;
determine a historical calling pattern and a historical location pattern of the third-party requestor, the historical calling pattern and the historical location pattern determined for a selected time period and relative to a stored location pattern associated with the third-party requestor;
request authentication information of the third-party requestor based on a result of the historical calling pattern and the historical location pattern of the third-party requestor determined relative to the stored location pattern associated with the third-party requestor;
determine a confidence level score representing a confidence level in a represented identity of the third-party requestor, wherein the confidence level score varies relative to a threshold confidence level score of the security condition based on one of a monitored characteristic of the third-party requestor and a determined location of the third-party requestor, and wherein the monitored characteristic includes the determined historical calling pattern, the previous historical location pattern, and the authentication information of the third party requestor;
responsive to a reduction in the confidence level score based upon the historical calling pattern and the historical location pattern, request additional authentication data from the third-party requestor in order to satisfy the threshold confidence level score;
selectively retrieve the selected subscriber data if the threshold confidence level score of the security condition is satisfied; and
transmit the selected subscriber data to the third-party requestor.

10. The apparatus of claim 9, wherein the subscriber data management element is further configured to determine whether a subscriber opt-in rule is associated with the selected subscriber data; and
retrieve the selected subscriber data if the subscriber opt-in rule is satisfied.

11. The apparatus of claim 10, wherein the subscriber opt-in rule is satisfied based on a subscriber opt-in response.

12. The apparatus of claim 11, wherein the subscriber data management element is further configured to determine a time-limit for receiving the subscriber opt-in response.

13. The apparatus of claim 11, wherein the subscriber data management element is further configured to update the subscriber opt-in rule based on the subscriber opt-in response.

14. The apparatus of claim 11, wherein the subscriber data management element is further configured to generate a new subscriber opt-in rule based on the subscriber opt-in response.

15. The apparatus of claim 9, wherein the subscriber data management element is further configured to maintain the subscriber data in a cache memory.

16. The apparatus of claim 9, wherein the selected subscriber data includes at least one of subscriber profile, device property or location data.

17. The apparatus of claim 9, wherein the security condition comprises an authentication confidence indication.

18. The apparatus of claim 9, wherein the application programming interface is further configured to receive the request from one of a Web-based provider portal, enterprise application or mobile application.

19. An article of manufacture including a non-transitory computer-readable medium having instructions stored thereon, that in response to execution by a computing device causes the computing device to perform operations comprising:
at a processor communicatively coupled to a digital data storage, maintaining subscriber data at the digital data storage, wherein the digital data storage is protected by a service provider firewall;
receiving, via an application programming interface communicatively coupled to the processor, a request from a third-party requestor to expose the subscriber data;
determining, by the processor in cooperation with the digital data storage, selected subscriber data and a security condition associated with the request;
determining historical calling pattern and a historical location pattern of the third-party requestor, the historical calling pattern and the historical location pattern determined for a selected time period and relative to a stored location pattern associated with the third-party requestor;
requesting authentication information of the third-party requestor based on a result of the historical calling pattern and the historical location pattern of the third-party requestor determined relative to the stored location pattern associated with the third-party requestor;
determining a confidence level score representing a confidence level in a represented identity of the third-party requestor, wherein the confidence level score varies relative to a threshold confidence level score of the security condition based on one of a monitored characteristic of the third-party requestor and a determined location of the third-party requestor, and wherein the monitored characteristic includes the determined historical calling pattern, the previous historical location pattern, and the authentication information of the third party requestor;

responsive to a reduction in the confidence level score based upon the historical calling pattern and the historical location pattern, requesting additional authentication data from the third-party requestor in order to satisfy the threshold confidence level score;

selectively retrieving, by the processor in cooperation with the digital data storage, the selected subscriber data if the threshold confidence level score of the security condition is satisfied; and transmitting, by the processor in cooperation with the digital data storage, the selected subscriber data to the third-party requestor.

20. The method of claim 1, further comprising generating at least a portion of the selected subscriber data based on the retrieved selected subscriber data if at least a portion of the selected subscriber data is unavailable to a service provider receiving the request.

21. The apparatus of claim 9, wherein the subscriber data management element is further configured to generate at least a portion of the selected subscriber data based on the retrieved selected subscriber data if at least a portion of the selected subscriber data is unavailable to a service provider receiving the request.

* * * * *